March 27, 1945.　　　M. B. MENTLEY　　　2,372,444
GEAR FINISHING
Filed March 30, 1942
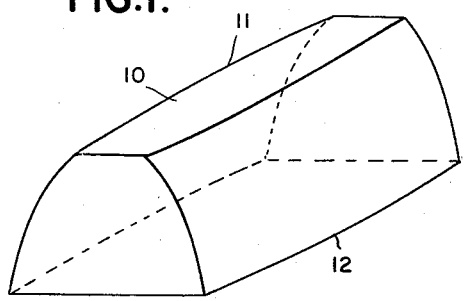
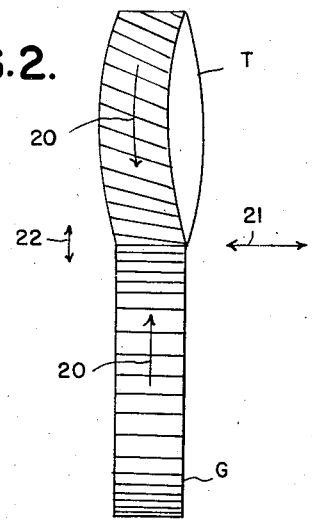
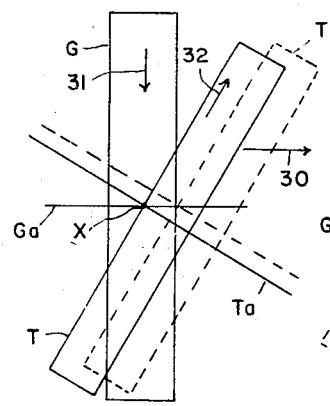
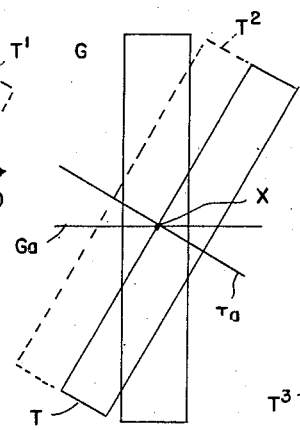
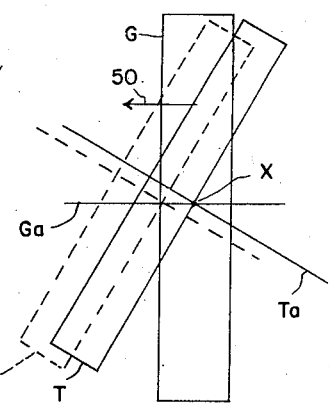
INVENTOR.
MAX B. MENTLEY
BY
ATTORNEYS Patented Mar. 27, 1945

2,372,444

UNITED STATES PATENT OFFICE 2,372,444

GEAR FINISHING

Max B. Mentley, Detroit, Mich., assignor to National Broach and Machine Company, Detroit, Mich., a corporation of Michigan Application March 30, 1942, Serial No. 436,897

6 Claims. (Cl. 90—1.6)

The present invention relates to gear finishing and more particularly to a method of simultaneously crowning and shaving gears.

The method employed is an improvement over crossed axes gear shaving in which the gear and a gearlike shaving tool are meshed with their axes crossed at a limited angle. The gear and tool are rotated in mesh, and the relative translation between the gear and tool is effected which distributes finishing action of the tool longitudinally of the gear teeth.

It has heretofore been suggested that gear teeth could be crowned during this operation by effecting an additional relative feed between the gear and tool in a direction radial of the gear, in which the additional feed was carried out in timed relation to the translation. In some cases good results could be obtained by this method, but it has been found that better results are obtained when the method is modified as disclosed herein.

It is an object of the present invention to provide a method of shaving gear teeth which comprises employing cutting edges on the cutter teeth which are substantially adjacent the ends thereof.

It is a further object of the present invention to provide a method for shaving gear teeth by rolling the gear in mesh at crossed axes with the shaving tool, and effecting the relative crowning motion made up of a translation generally parallel to the axis of the gear teeth and a timed relative feed between the gear and tool radially of the gear, in which cutting takes place only during the relatively radial infeed, the gear and tool being moved into clearance position during the back stroke.

It is a further object of the invention to shave gears by the method as referred to above, in which the direction of rotation of the gear and tool are reversed when cutting operation reaches the middle of the gear tooth.

Other objects of the invention will be apparent as the description proceeds, and when taken in conjunction with the accompanying drawing; wherein:

Figure 1 is a perspective view of a crowned gear tooth;

Figure 2 is a diagrammatic view illustrating the meshing relationship between the gear and tool;

Figure 3 is a diagrammatic view illustrating the relationship between the gear and tool upon commencing to cut the left half of a gear tooth;

Figure 4 is a diagrammatic view showing an adjustment of tool between right and left cutting strokes; and Figure 5 is a diagrammatic view similar to Figure 3, showing the relationship between gear and tool upon commencing to cut the right half of the gear teeth.

Referring first to Figure 1, I have shown at 10 a gear tooth which is crowned. The crowned shape of the tooth, as seen in Figure 1, appears as curved lines 11 and 12 showing the longitudinal curvature of the tooth 10. The crowned shape of the tooth may be considered as longitudinal relief so that the tooth is thicker at its mid section than at either end thereof.

Teeth of this shape are coming into increasing demand for the reason that they operate more quietly than uncrowned teeth and permit certain amounts of shaft misalignment or distortion under load without creating strict end bearing between meshing gear teeth. This avoidance of end bearing results in greater tooth life since it has been found that a large proportion of gear failures is directly attributable to end bearing.

Various methods have previously been suggested for crowning gear teeth, and among these is a method disclosed in Drummond Patent 2,157,981, in which a relative rocking motion is effected between the gear and tool during a crossed axes shaving operation.

According to the present method the tool and gear to be crowned are brought into mesh with their axes crossed at an angle preferably less than 30°. This results in establishing a limited area of contact between the teeth of the gear meshing with the teeth of the tool, due to the crossed axes relationship. When the gear and tool are then rotated in mesh this limited area of contact becomes a limited zone of contact extending generally up and down the face of the teeth of the gear. During rotation of the gear and tool, one of the parts is positively rotated and the other part is driven solely through the meshed engagement between the gear and tool.

In order to distribute the finishing action of the tool longitudinally from end to end of the teeth of the gear, a relative translation is introduced. In Figure 2 I have illustrated diagrammatically a tool T in mesh with a gear G. The direction of rotation is indicated by the arrows 20. The relative translation which is necessary to distribute the finishing action of the teeth of the tool T longitudinally from end to end of the teeth of the gear G is illustrated by the arrow 21. If this translation is combined with the rotation without other relative movement the teeth of the gear G will be finished uniformly from end to end, or in other words they will be uncrowned. In order to impart a crowned shape to the teeth of the gear G, a second relative motion in the direction of the arrow 22 is set up between the gear and tool in timed relation to the relative reciprocation represented by the arrow 21. The timed relationship between the radial feed indicated by the arrow 22 and the translation indicated by the arrow 21 will be explained. When the gear and tool are in that portion of relative translation which causes the teeth of the tool to contact the teeth of the gear at their mid portions, the axes of the tool T and the gear G are separated by a maximum distance. As translation takes place in either direction from this mid position, it is combined with a relative feed radially inward of the gear G. As will be apparent, this has the effect of machining increasingly more material adjacent the ends of the teeth of the gear and therefore results in the crowned shape shown in Figure 1.

One of the disadvantages of this method is that it has been found that the amount of crown which can thus be imparted to the teeth of the gear is strictly limited. While it is true that the instantaneous contact between meshing teeth of a gear and tool meshed at crossed axes is a limited area due to the fact that both surfaces are convex, nevertheless these surfaces approach parallelism sufficiently so that if any very substantial amount of relative radial infeed is provided, interference develops.

If not corrected, this would have the effect of reshaving the center of the gear teeth with a portion of the cutter removed from the zone of the common normal to the axes of gear and tool. This in turn would introduce a profile error, or require modification of the cutter. This last is impractical because the cutter is still operating on another portion of the gear teeth adjacent said common normal, and such modification of cutter teeth could not therefore be uniform.

Accordingly, the present invention contemplates meshing the gear and tool during the cutting operation such that the cutting action is effected by portions of the teeth of the tool adjacent one end thereof. When the gear and tool are meshed at crossed axes, the contact between the teeth thereof takes place in a zone at and adjacent to the common normal to their axes. Thus in Figures 2–5 I have illustrated the tool T meshing with a gear G. The axis Ta of the tool is illustrated, as is the axis Ga of the gear. The common normal to these axes, which is a line perpendicular to the plane of the paper, is indicated at X. It will thus be seen that cutting with the parts engaged as shown in Figure 3 takes place adjacent the left-hand end of the teeth of the tool T.

If now a relative motion between the gear and tool is provided which causes the tool T to move in the direction of the arrow 30 (Fig. 3) with respect to the gear G, it will be apparent that a substantial amount of crowning motion which is radially inward with respect to the gear G may be provided without interference.

It has been found that the most effective cutting takes place during the relative motion which causes the tool T to move relative to the gear G in the direction of the arrow 30. Accordingly, when the relative motion is reversed, it is preferred to move the tool and gear relative to each other such that on its return stroke, their teeth are in loose mesh and no cutting is effected.

The right-hand half of the teeth of the gear G, as seen in Figure 3, will be machined while the tool T moves to the dotted line position T'. Then the gear and tool are moved in loose mesh and the tool is relatively moved back to full line position. At this time one-half of each of the teeth of the gear is machined.

In order to machine the other half of the teeth of the gear, it is desirable to employ the opposite ends of the teeth of the cutter and for this purpose the cutter is shifted as shown in Figure 4. In this figure, with the tool T in the full-line position relative to the gear G, it is necessary to shift it to the dotted-line position $T^2$ if the other end of the cutter teeth are to be used. This may be done readily by shifting the tool axially for a distance equal to its face width.

The crown cutting of the other half of each of the teeth may then be carried out, as illustrated in Figure 5. In this figure it will be observed that the common normal X to the axis Ta of the tool and Ga of the gear is adjacent the right-hand edge of the tool T and is located midway between the ends of the teeth of the gear G. At this time a relative translation between the gear and tool is effected, such that the tool T moves in the direction of the arrow 50 relative to the gear to the position shown in dotted lines.

This relative translation is accompanied by a relative feed radially inward with respect to the gear so as to remove material from adjacent the left end of the teeth of the gear G. This results in shaping the teeth of the gear to the shape illustrated in Figure 1.

Before the relative translation between the gear G and tool T is reversed, the parts are moved into loose mesh, as previously described in connection with Figure 3. This avoids cutting while return relative translation is taking place from dotted line position $T^3$ to full line position.

The method as thus far described may be carried out with the conventional serrated shaving tool, which may cut with cutting edges spaced somewhat from the end of the teeth. If preferred, however, under certain circumstances it may be possible to employ a cutter for cutting only on the corners of the teeth. In some cases it is desirable to control the direction of rotation so as to effect a cut with the corners of the teeth, whether or not the teeth are serrated. At any event, in order to obtain uniform results at opposite ends of the gear teeth, it is desirable to reverse the rotation before commencing the cut at opposite ends of the gear teeth.

Referring to Figure 3, the direction of rotation of the gear G and tool T is indicated by the arrows 31 and 32. It will be observed that in this case the direction of rotation of the tool T is such that the ends of its teeth adjacent the common normal X are moved toward the center of the gear so as to effect a cutting or shaving action. In this case, since no portion of the cutter teeth extends beyond the cutting edges toward the center of the gear teeth, there can be no interference. However, it is ordinarily desirable to have guiding lands at both sides of a cutting edge, and to obtain this condition, grooves spaced inwardly from the the ends of the cutter teeth will be employed to provide cutting edges. In this case the direction of rotation may be in either direction, but should be in opposite directions at opposite ends of the gear teeth to insure uniform results.

It will be appreciated that the relative motion which is due to the crossed axes setting is relatively rapid and is at cutting speeds due to the speed of rotation of the gear and tool. The relative translation in the direction of the arrow 30 is very slow, as is the relative radial infeed.

When the cutting operation illustrated in Figure 5 is being carried out, the direction of rotation of the gear and tool is of course reversed. Accordingly the relative motions between the gear and tool, which are necessary to combining the shaving and crowning operation, are as follows: At the beginning of the cutting stroke the gear and tool are meshed such that the common normal to their axes is located substantially at the center of the gear and is located substantially at one edge of the tool or cutter. The direction of rotation of the gear and tool may be such that the ends of the tool teeth which are engaged, move forwardly across the face of the gear teeth toward the center thereof, or opposite thereto. Relative translation moving the meshed teeth of the tool away from the center of the gear teeth and toward an end thereof is provided and is accompanied by a relative infeed radially of the gear. At the end of the stroke when the teeth of the gear have been machined completely to one end thereof, the gear and tool are moved into loose mesh and are returned to initial position. Prior to the next succeeding stroke the cutter or tool T is shifted axially to the position shown in Figure 4, such that the opposite end of its teeth are adjacent the common normal X. The direction of rotation is reversed and the translation in the direction of the arrow 40 is effected to machine the other half of the teeth of the gear G. This operation may be repeated with additional incremental feed as many times as necessary to remove material to the proper depth, and the result is gear teeth which are not only smoothly shaved and corrected as to profile, spacing, eccentricity, etc., but also the teeth have a desirable form of crowning imparted thereto.

It is appreciated that this method may be carried out on suitable automatic machines, but it may also be carried out by a hand operation of standard machines available today.

While the method has been described in considerable detail, it will be appreciated that this has been done solely to enable those skilled in the art to practice the invention, the scope of which is indicated by the appended claims.

What I claim as my invention is:

1. The method of crowning the teeth of a gear which comprises running it in mesh with a gearlike cutter such that only the end portions of the teeth of the cutter are employed, and taking cutting strokes beginning at the mid portion of the gear teeth and finishing at an end thereof by relatively moving said gear and cutter such that the said cutter teeth move longitudinally relative to said gear teeth away from the operating end portions thereof, returning said gear and cutter to approximately initial position in loose mesh, relatively shifting said gear and cutter to bring the other end portion of said cutter teeth into operative position to the centers of the gear teeth, and machining the opposite ends of said gear teeth in like manner.

2. The method of crowning the teeth of a gear which comprises running it in mesh with a gearlike cutter such that the end portions of the teeth of the cutter are employed, and taking cutting strokes beginning at the mid portion of the gear teeth and finishing at an end thereof by relatively moving said gear and cutter such that the said cutter teeth move longitudinally relative to said gear teeth away from the operating end portions thereof, returning said gear and cutter to approximately initial position in loose mesh, relatively shifting said gear and cutter to bring the other end portion of said cutter teeth into operative position to the centers of the gear teeth, reversing the rotation of said gear and tool, and machining the opposite ends of said gear teeth in like manner.

3. The method of crowning a gear which comprises meshing the gear with a gearlike finishing tool with the axes of said gear and tool extending at limited crossed axes, rotating said gear and tool in mesh, and relatively moving said tool and gear in a cutting stroke which is initiated with the ends of the tool teeth engaging the mid portion of the gear teeth, said cutting stroke comprising a relative translation effective to move the contact on the gear teeth gradually to the end thereof toward said tool and a relative infeed radially of said gear, whereby cutting is effected by portions of said tool teeth substantially at an end thereof.

4. The method of crowning the teeth of a gear which comprises rotating the gear in mesh at crossed axes with a gearlike cutting tool, and effecting a progressively deeper crowning cutting stroke which starts with the gear and tool positioned such that the common normal to their axes and as a result the limited contact between the teeth of the gear and tool is located substantially centrally of the gear and at an edge of said tool, said stroke being in a direction such that at its end the common normal to the axes is at the same edge of said tool and is at the edge of said gear such that said tool and gear be at opposite sides of the common normal.

5. The method of crowning gears which comprises running them in mesh at limited crossed axes, employing only the end portions of the cutter teeth to effect cutting and effecting a progressively deeper crowning cut from the mid portions of the gear teeth toward those ends thereof which result in all except the said end portions of the meshing cutter teeth extending beyond the ends of meshing gear teeth at the end of the cutting stroke.

6. The method of crowning the teeth of a gear which comprises rotating in mesh the gear and a gear-like cutting tool with the gear and tool at crossed axes and the common normal to the axes and as a result the limited contact between the teeth of the gear and tool at an edge of the tool, relatively translating the gear and tool longitudinally of the gear, and relatively moving the gear and tool toward each other while the gear and tool are being relatively translated from a position in which the common normal is located between the edges of the gear to a position in which the common normal is located at an edge of the gear and the tool extends beyond the last mentioned edge.

MAX B. MENTLEY.